United States Patent

Rajna

[15] 3,704,923
[45] Dec. 5, 1972

[54] BEARING ASSEMBLY FOR ELECTRIC MOTORS

[72] Inventor: Andrew Rajna, Kitchener, Ontario, Canada

[73] Assignee: Electrohome Limited, Kitchener, Ontario, Canada

[22] Filed: Oct. 18, 1971

[21] Appl. No.: 190,053

[52] U.S. Cl. ................................................. 308/132
[51] Int. Cl. ........................... F16c 35/00, F16c 33/66
[58] Field of Search ............................. 308/121, 132

[56] References Cited

UNITED STATES PATENTS 3,499,504  3/1970  Nelson ................................. 308/121

Primary Examiner—Martin P. Schwadron
Assistant Examiner—Frank Susko
Attorney—Peter W. McBurney et al.

[57] ABSTRACT

A spherical bearing assembly for an electric motor is disclosed, constructed such that the axial location of the shaft is not dependent upon the end bell or end wall of the electric motor. By affixing the bearing assembly to the end bell or end wall of the motor after all other operations have been performed on the latter, a true axial alignment of the shaft with the field core can be attained without the risk that subsequent operations will cause misalignment.

7 Claims, 3 Drawing Figures

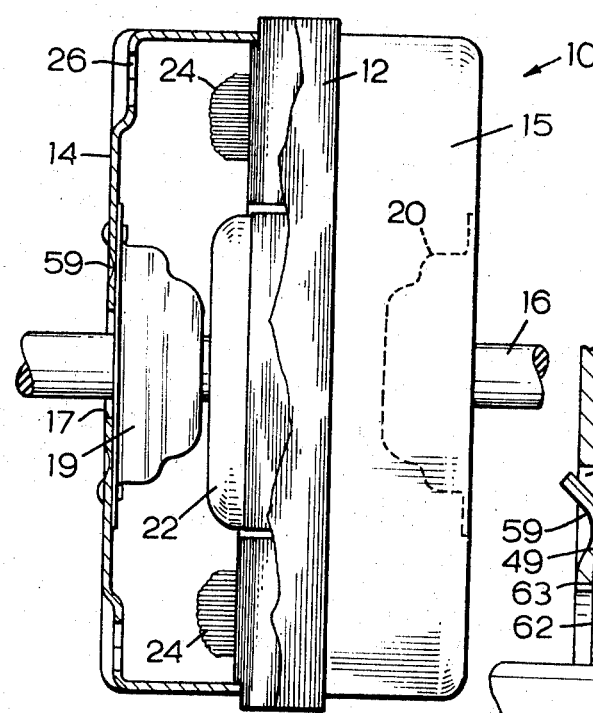

BEARING ASSEMBLY FOR ELECTRIC MOTORS

This invention relates generally to electric motors, and has to do particularly with a bearing assembly adapted to mount the motor shaft for free rotation with respect to an end wall of the motor housing.

DISADVANTAGES OF THE PRIOR ART

Electric motors of the kind to which this invention relates have covers or housings which are usually composed of either two end bells, or two end plates plus an intermediate, substantially cylindrical shell. In the construction employing two end bells, the latter are usually substantially identical, and are reversed with respect to each other, so that each opens in the direction of the other. Conventionally, the end bell itself is stamped or otherwise formed so that it includes an integral spherical bearing seat against which a spherical bearing in which the motor shaft rotates, is positioned. When originally formed, and prior to the assembly of the motor, the bearing seat formed integrally with the end bell is exactly concentric with respect to the register diameter of the end bell. However, subsequent operations such as providing vent holes, lances and lead exit holes, and putting brackets on the cover by welding or riveting, may and often do destroy the concentricity between the bearing seat and the register diameter. Naturally, in addition to the bearing seat formed integrally with the end bell, the bearing assembly is completed by the addition of the conventional springs, annular felt members, oil slingers and housing, all of which are secured to the end bell.

Another disadvantage of conventional motor constructions relates to the fact that, in A.C. motors, the field coils are longer than the rotor end rings or coils, which means that considerable space remains between the rotor and the end bells. This space is unused due to the fact that, conventionally, the bearing assemblies extend partially or wholly outside of the end bells.

Another disadvantage of conventional motor constructions relates to the fact that, when any portion of the bearing assembly extends outside of the end bell, or in any other way requires a central protrusion of the end bell, it is not possible to mount the motor using flat mounting brackets, these being less expensive than the brackets required when the motor has central projections as its ends.

Yet another disadvantage of conventional motor constructions relates to the expense and awkwardness involved when, in order to provide an oil recirculating system and thus prolong the life of the motor, it becomes necessary to provide additional external oil-catching and redirecting means.

OBJECTS OF THIS INVENTION

It is one object of this invention to provide a bearing assembly for use with an electric motor, the construction of the assembly being such as to eliminate the risk of losing concentricity between the motor shaft and the field core supporting the field coils.

A further object of this invention is to provide a simple and inexpensive oil recirculating system for an electric motor bearing assembly.

A further object of this invention is to eliminate the need for any projection centrally of the end bells of an electric motor, whether the projection be integral with the end bell or an additional part.

Yet another object of this invention is to make efficient use, particularly in an A.C. motor, of any space which naturally exists between the rotor and the end bells of the motor.

GENERAL DESCRIPTION OF THIS INVENTION

Accordingly, this invention provides, in an electric motor, the combination of a shaft, a substantially flat end wall normal to said shaft, and a bearing assembly secured to said end wall, the bearing assembly comprising: a spherical bearing through which the shaft passes, a retainer having a flange secured to said end wall and having radially inwardly of said flange a bearing seat adapted to receive said spherical bearing, a spring member having an annular flange portion and a contact portion adapted to urge the spherical bearing against the bearing seat of the retainer, a first resilient annular oil-reservoir member between the end wall and the retainer, a second resilient annular oil-reservoir member between the spring member and the retainer, a housing secured to said end wall and defining therewith an enclosure containing all parts of the bearing assembly, and two annular oil slingers mounted on said shaft within said enclosure, one on either side of said spherical bearing, both the retainer and the spring member having aperture means opening on the adjacent oil-reservoir member.

GENERAL DESCRIPTION OF THE DRAWINGS

One embodiment of this invention is shown in the accompanying drawings, in which like numerals denote like parts throughout the several views, and in which:

FIG. 1 is a partly broken-away elevation view of an electric motor, part of the view being an axial section;

FIG. 2 is a perspective, exploded view of a motor end bell and the components of the bearing assembly of this invention; and FIG. 3 is an axial sectional view of the bearing assembly of this invention, in assembled condition.

PARTICULAR DESCRIPTION OF THE DRAWINGS

FIG. 1 shows a motor 10 comprising a field core 12, a first end bell 14 and a second end bell 15. A central shaft 16 extends through a central aperture 17 in the first end bell 14, through a first bearing assembly 19, and terminates at a second bearing assembly 20. The first bearing assembly 19 is secured to the first end bell 14, while the second bearing assembly 20 is secured to the second end bell 15. Mounted on the shaft 16 is a conventional rotor 22, and wound on the field core 12 are the conventional field coils 24. The end bells 14 and 15 have the usual case-bolt holes 26.

The feature of this invention which particularly conveys the advantage that concentricity between the shaft 16 and the field core 12 need not be lost through subsequent welding, etc. operations performed on the end bell, is that the bearing assemblies 19 and 20 are completely self-contained as regards the supporting of the spherical bearing, and can be secured in their final positions against the end bells after all welding, etc. operations have taken place on the end bells.

FIG. 2 shows the different parts of the bearing assembly of this invention, while FIG. 3 shows the bearing assembly in its assembled condition. Referring to both FIGS. 2 & 3, the bearing assembly of this invention includes a spherical bearing 28 adapted to be mounted on the central shaft 16, a retainer 30 having a flange 31 which is adapted to be secured to the flat end wall 33 of the end bell 14, and a housing 35 which defines, with the end wall 33, an enclosure containing all parts of the bearing assembly. The retainer has, inwardly of the flange 31, a bearing seat 38 which is adapted to receive the spherical bearing 28, as shown in FIG. 3. The bearing assembly further includes a spring member 40 which has an annular flange portion 42 and a contact portion 44 adapted to urge the spherical bearing 28 against the bearing seat 38 of the retainer 30. As can be seen in FIG. 2, the spring member 40 has a central aperture 46 and a plurality of slots 47 radiating outwardly from the central aperture 46, whereby the contact portion 44 becomes, in effect, a plurality of resilient fingers adapted to resiliently maintain the spherical bearing 28 in contact with the bearing seat 38.

A first annular felt member 49 is located between the flat end wall 33 of the end bell 14 and the retainer 30. As can be seen in FIGS. 2 and 3, the retainer 30 has, at the inner edge of its flange 31, a cylindrical, axially projecting portion 50 which merges into a radially extending portion 52 at the inner edge of which the bearing seat 38 is located. As seen in FIG. 3, the first annular felt member 49 is located against the radially extending portion 52. The latter portion 52 has a plurality of apertures 54 which open against the annular felt member 49.

Situated between the retainer 30 and the spring member 40 is a second annular felt member 56 which is in contact with the spherical bearing 28, as seen in FIG. 3.

The housing 35 has a housing flange 58 adapted to overlie the flange 31 of the retainer 30 and to be secured with the flange 31 against the end wall 33 of the end bell 14. From its flange 58, the housing 35 extends axially and then radially inwardly to contact the annular flange portion 42 of the spring member 40, as is particularly seen in FIG. 3. The housing 35 then extends convergingly in the axial direction to encompass the remainder of the spherical bearing 28, and terminates in an opening 60 through which the central shaft 16 passes.

Two annular oil slingers 62, of conventional construction, are mounted securely on the central shaft 16, within the enclosure defined between the housing 35 and the end wall 33, one slinger on either side of the spherical bearing 28. Between each slinger 62 and the spherical bearing 28 is a loose-fitting thrust washer 63, the purpose of which is to reduce noise and other frictional effects between the rotating oil slingers 63 and the stationary spherical bearing 28. The oil slingers 63 may have plane surfaces or may carry radial ridges as shown.

The slots 47 in the spring member 40 extend to locations adjacent the second annular felt member 56, and thus constitute apertures through which oil may pass to or from the second annular felt member 56.

In FIG. 3, the movement of the oil is indicated by small arrows. The left-hand slinger 62 slings the oil into the first annular felt member 49, from which it passes into the second annular felt member 56 and back to the spherical bearing 28. The right-hand slinger 62 slings the oil against the housing 35, from which it passes through the slots 47 and directly into the second annular felt member 56, thence back to the spherical bearing 28.

In order that the felt members 49 and 56 be pressed into oil-communicating contact through the apertures 54, the end wall 33 has an annular rib 59 which urges the felt member 49 against the portion 52 of the retainer 30, as seen in FIG. 3. The rib 59 also stiffens the end wall 33. The spring member 40 has a peripheral lip 61 which urges the felt member 56 leftwardly against the retainer 30.

FIG. 3 also shows the provision of an oil tube hole 76 in the housing 35 and an oil lance 77, both of which are located in an uppermost position when the electric motor is oriented with the shaft horizontal.

It will be appreciated that the bearing assembly herein disclosed can be utilized regardless of whether the central shaft 16 passes through the end wall 33, or stops short of the end wall 33. In the latter case, of course, the end wall 33 need not have an aperture 17.

It will now be understood that the bearing assembly of this invention need not be secured to the motor casing until near the end of the motor assembly operation, thereby ensuring that the bearing will be properly located in the motor. Although it would be possible to accomplish the affixing of the bearing assembly to the end wall 33 in the desired location by spot-welding, projection welding or other procedures not requiring the punching or drilling of registry holes, it is preferred to provide a plurality of apertures 80a in the end wall 33, a plurality of apertures 80b in the retainer flange 31, and a plurality of apertures 80c in the housing flange 58. In the drawings each element has three apertures in triangular relationship capable of mutual registry. The apertures 80a and 80c are the same size, while apertures 80b are larger. To assemble the parts, rivets or eyelets are passed through the aligned apertures, and the enlarged apertures 80b permit an adjustment of the axial alignment of the retainer 30 with respect to the end bell 14 prior to locking the parts together.

Naturally, while the bearing assembly disclosed herein is particularly suited to A.C. motors where a certain amount of waste space is presently located between the rotor and the end bells, there is no reason why the bearing assembly disclosed herein could not be utilized with D.C. motors. In either case the bearing assembly could be mounted either inside or outside the end wall 33.

In the appended claims, the expression "resilient annular oil reservoir member" is intended to include all materials, such as felt, which are capable of retaining oil in their interstitial spaces or pores, while at the same time dispersing the oil as it is required for lubricating purposes.

What I claim as my invention is:

1. In an electric motor, the combination of a shaft, a substantially flat end wall normal to said shaft, and a bearing assembly secured to said end wall, the bearing assembly comprising:
 a spherical bearing through which the shaft passes,
 a retainer having a flange secured to said end wall and having radially inwardly of said flange a bearing seat adapted to receive said spherical bearing, a spring member on the side of the retainer remote from said end wall, said spring member having an annular flange portion and a contact portion which is adapted to urge the spherical bearing against the bearing seat of the retainer, a first resilient annular oil-reservoir member between the end wall and the retainer, a second resilient annular oil-reservoir member between the spring member and the retainer, a housing secured to said end wall and defining therewith an enclosure containing all parts of the bearing assembly, and two annular oil slingers mounted on said shaft within said enclosure, one on either side of said spherical bearing, both the retainer and the spring member having aperture means opening on the adjacent oil-reservoir member.

2. The invention claimed in claim 1, in which said housing has a housing flange overlying the flange of the retainer and secured therewith against the end wall, the spring member being entrapped between the housing and the second oil-reservoir member.

3. The invention claimed in claim 1, in which an oil lance aperture is provided in the end wall and in which an oil tube hole is provided in the housing.

4. The invention claimed in claim 1, in which the oil-reservoir members are of felt.

5. The invention claimed in claim 1, in which the end wall is part of an end bell.

6. The invention claimed in claim 1, in which a loose-fitting thrust washer is provided between each oil slinger and the spherical bearing.

7. The invention claimed in claim 1, in which the end wall has an annular rib extending toward said first oil-reservoir member, and urging the latter against said retainer, the spring member having a peripheral lip extending toward the second oil-reservoir member and urging the latter against said retainer.

* * * * *